(12) United States Patent
Vyas et al.

(10) Patent No.: US 7,622,211 B2
(45) Date of Patent: Nov. 24, 2009

(54) HYDROPHILIC FUEL CELL BIPOLAR PLATE HAVING A PLASMA INDUCED POLYMERIZATION COATING

(75) Inventors: Gayatri Vyas, Rochester Hills, MI (US); Tao Xie, Troy, MI (US); Thomas A. Trabold, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 826 days.

(21) Appl. No.: 11/141,905

(22) Filed: Jun. 1, 2005

(65) Prior Publication Data

US 2006/0275642 A1  Dec. 7, 2006

(51) Int. Cl.
*H01M 2/02* (2006.01)
*B05D 5/12* (2006.01)

(52) U.S. Cl. .............................. 429/34; 429/38; 427/115

(58) Field of Classification Search .................. 429/34, 429/38, 39; 427/115; 204/295
See application file for complete search history.

(56) References Cited

U.S. PATENT DOCUMENTS 4,197,178 A * 4/1980 Pellegri et al. ............... 204/255

FOREIGN PATENT DOCUMENTS

JP         2001093539        6/2001

WO      WO 2004/100286 A2    11/2004

OTHER PUBLICATIONS

Official Letter issued by the German Patent Office on Jul. 4, 2008 relating to German Patent Application No. 102006025124.5 (4 pages) and the English translation of the Official Letter (4 pages).

Desai, Shrojal M. et al, "Fabrication of long-term hydrophilic elastomeric surfaces via plasma induced surface cross-linking of functional monomers," Surface & Coatings Technology, 184 (2004) 6-12, www.sciencedirect.com.

* cited by examiner

*Primary Examiner*—Raymond Alejandro
(74) *Attorney, Agent, or Firm*—Harness, Dickey & Pierce, P.L.C.

(57) ABSTRACT

A fuel cell electrically conductive element is provided with a polymeric surface comprising a flow field, at least a part of the flow field having a grafted, permanently hydrophilic, polymer coating. The element is made by applying a layer of a monomer mixture of a hydrophilic, ethylenically-unsaturated monomer and a crosslinking monomer to the electrically conductive element surface and polymerizing the applied monomer mixture layer with a plasma whereby the polymerized layer is grafted to the polymeric surface.

14 Claims, 2 Drawing Sheets

HYDROPHILIC FUEL CELL BIPOLAR PLATE HAVING A PLASMA INDUCED POLYMERIZATION COATING

FIELD OF THE INVENTION

The present invention relates generally to electroconductive elements, and more particularly flow field plates such as bipolar plates and end plates and to fuel cells containing flow field plates.

BACKGROUND OF THE INVENTION

Fuel cells have been proposed as a power source for electric vehicles and other applications. One type of fuel cell is the proton exchange membrane (PEM) fuel cell that includes a membrane-electrode-assembly (MEA) comprising a thin, solid polymer membrane electrolyte having an anode on one face and a cathode on the opposite face. The anode and cathode typically comprise finely divided carbon particles, very finely divided catalytic particles supported on the internal and external surfaces of the carbon particles, and proton conductive material intermingled with the catalytic and carbon particles. The MEA is sandwiched between a pair of electrically-conductive contact elements that serve as current collectors for the anode and cathode and that contain appropriate flow channels and openings ("flow field") for distributing the fuel cell's gaseous reactants ($H_2$ or other gaseous fuel supplied to the anode and $O_2$/air or other oxidizing gas supplied to the cathode) over the surfaces of the anode and cathode. In the case of hydrogen as the fuel and oxygen as the oxidizing gas, water is generated at the cathode from the oxidation of the hydrogen fuel. Efficient fuel cell operation involves water transport from the cathode to prevent water from building up and blocking flow channels for distribution of the reactants (called "flooding" the fuel cell).

PEM fuel cells comprise a plurality of the MEAs stacked together in electrical series while being separated one from the next by an impermeable, electrically-conductive contact element known as a bipolar plate or septum. The bipolar plate has two working surfaces, one confronting the anode of one cell and the other confronting the cathode on an adjacent cell in the stack, to conduct electrical current between the adjacent cells. The bipolar plate is formed with flow fields on its working surfaces for gas distribution. The bipolar plate, because it is located against the cathode, also affects water removal from the cell and water movement within the cell.

SUMMARY OF THE INVENTION

In one embodiment, the present invention provides a fuel cell electrically conductive element having a surface with a flow field, particularly a bipolar plate, at least part of the flow field having a permanently hydrophilic, polymer coating. The polymer coating is chemically bonded to the bipolar plate. A "hydrophilic polymer coating" is one that has a dynamic contact angle for water, as measured using the Wilhelmy plate method, of 45° or less for both advancing and receding contact angles, or that has a contact angle of 45° or less for a sessile drop of water, or both.

In another embodiment, the invention provides a fuel cell containing a plurality of MEAs in electrical series separated by an electrically conductive element, e.g., bipolar plate, having a permanently hydrophilic polymer coating chemically bonded to at least a portion of a flow field in a face adjacent a cathode of a membrane electrode assembly. The hydrophilic polymer coating aids removal of the hydrophilic reaction product from the fuel cell. The hydrophilic polymer coating may also be used to inhibit corrosion of the electrically conductive element by the reaction product.

In another aspect, the invention provides a method of applying a permanently hydrophilic polymer coating on an electrically conductive element, in which a monomer mixture comprising hydrophilic, ethylenically-unsaturated monomer is applied to the electrically conductive element and the applied monomer is subjected to plasma-induced polymerization. In one embodiment, a bipolar PEM fuel cell is prepared by stacking a plurality of MEAs together in electrical series the MEAs being separated one from the next by electrically conductive plates with a permanently hydrophilic polymer coating prepared as described. The plasma that induces polymerization also chemically bonds the coating to the conductive element.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In one aspect, the present invention provides an electrically conductive element in a proton exchange membrane (PEM) fuel cell that includes a membrane-electrode assembly (MEA), the electrically conductive element having a face adjacent to at least one electrode of the MEA. The conductive element comprises a flow field in the face adjacent to the electrode for distributing reactant gas to the electrode and for removing product water from the electrochemical reaction of the fuel cell. In one embodiment, the fuel is hydrogen and the oxidant is oxygen (which may be supplied as air). The flow field has a chemically bonded, permanently hydrophilic polymeric coating to facilitate product water removal from the cell. The coating is on at least a portion of the flow field, and may be on most or essentially all of the flow fields on both anode and cathode sides of a bipolar plate between MEAs. The hydrophilic polymer coating has a dynamic contact angle for water, as measured using the Wilhelmy plate method, of 45° or less, preferably 30° or less, for both advancing and receding contact angles, or that has a contact angle of 45° or less, preferably 30° or less, for a sessile drop of water, or both.

In certain embodiments, the electrically conductive element has a face adjacent to the cathode of the MEA. The conductive element comprises a flow field in the face adjacent to the cathode for distributing oxygen or other oxidizing gas to the cathode, at least a portion of the flow field having the chemically adhered (i.e., chemically bonded to the flow field surface), permanently hydrophilic polymeric coating to aid in removing product water.

Figure 1:
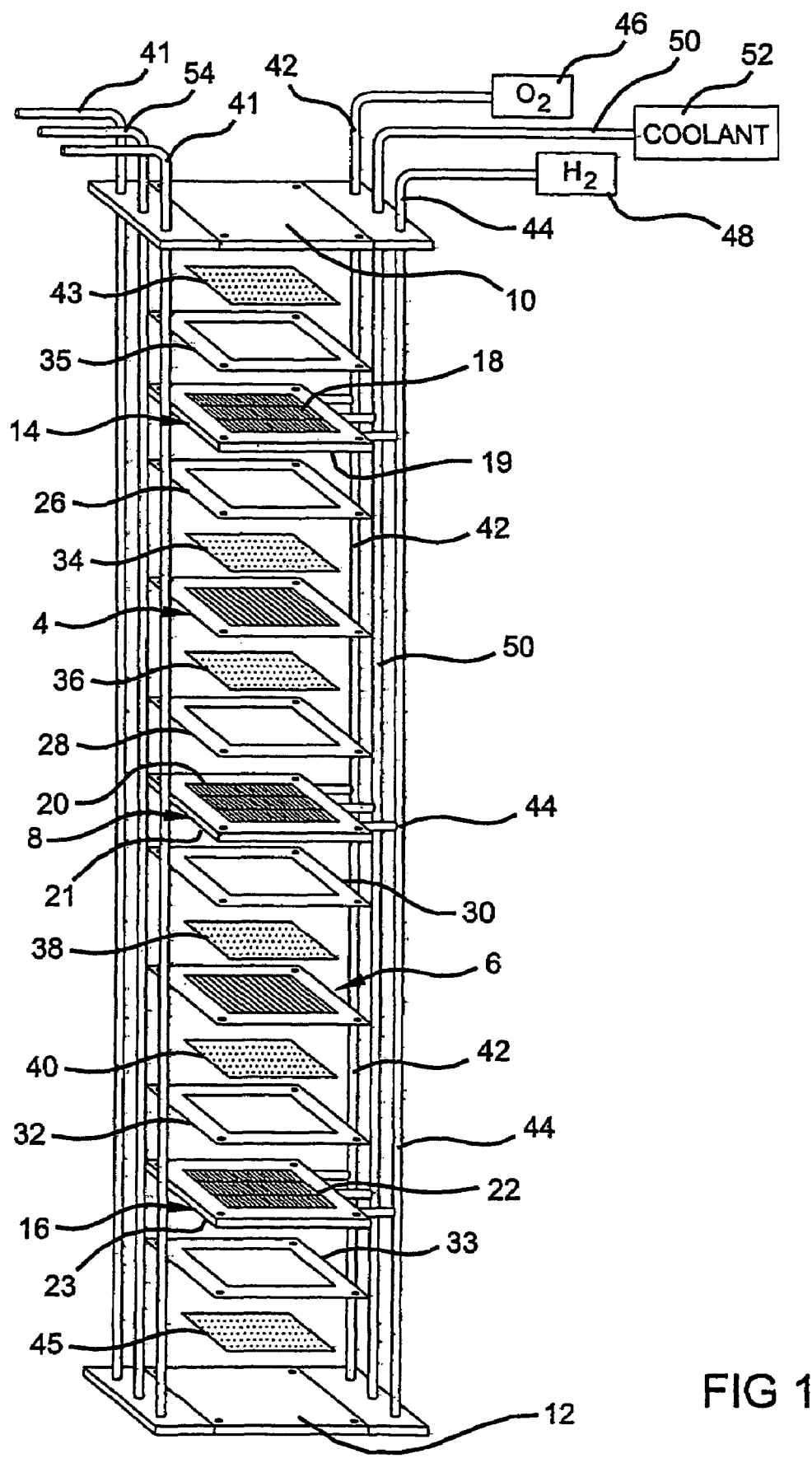
FIG. 1 is a schematic, exploded, isometric illustration of a liquid-cooled proton exchange membrane fuel stack showing only two cells in the stack.

To aid in understanding the invention, an exemplary fuel cell and stack are shown generally in FIG. 1. Two individual proton exchange membrane (PEM) fuel cells connected to form a stack have a pair of membrane-electrode-assemblies (MEAs) 4 and 6 and gas diffusion media 34, 36, 38, 40 separated from each other by an electrically conductive, liquid-cooled bipolar separator plate 8. An individual fuel cell, which is not connected in series within a stack, has a separator plate 8 with a single electrically active side. In a stack, a preferred bipolar separator plate 8 typically has two electrically active sides 20, 21 within the stack, each active side 20, 21, respectively, facing a separate MEA 4, 6 with opposite charges that are separated, hence the so-called "bipolar" plate name for the separator plate 8. The fuel cell stack of FIG. 1 has conductive bipolar plates, but the present invention is equally applicable to the conductive plates ("end plates") of a single fuel cell.

The MEAs 4 and 6, and bipolar plate 8 are stacked together between stainless steel clamping plates 10 and 12, and end contact elements 14 and 16. The end contact elements 14 and 16, as well as both working faces or sides 20, 21 of the bipolar plate 8, contain a plurality of channels forming flow fields on the active faces 18, 19, 20, 21, 22 and 23 for distributing fuel and oxidant gases to the MEAs 4 and 6. The gaseous fuel may be $H_2$ and the oxidant gas may be oxygen (which may be supplied as air containing oxygen). Nonconductive gaskets or seals 26, 28, 30, 32, 33 and 35 provide seals and electrical insulation between the several components of the fuel cell stack. Gas-permeable conductive diffusion media 34, 36, 38 and 40 press up against the electrode faces of the MEAs 4 and 6. Additional layers of conductive media 43, 45 are placed between the end contact fluid distribution elements 14, 16 and the terminal collector plates 10, 12 to provide a conductive pathway therebetween when the stack is compressed during normal operating conditions. The end contact fluid distribution elements 14, 16 press up against the diffusion media 34, 43 and 40, 45 respectively.

Oxygen is supplied to the cathode side of the fuel cell stack from storage tank 46 via appropriate supply plumbing 42, while hydrogen is supplied to the anode side of the fuel cell from storage tank 48 via appropriate supply plumbing 44. Alternatively, air may be supplied to cathode side from the ambient, and hydrogen to the anode from a methanol, methane, or gasoline reformer or the like. Exhaust plumbing 41 for both the $H_2$—$O_2$/air sides of the MEAs is also provided. Additional plumbing 50 is provided for circulating coolant from a storage area 52 through the bipolar plate 8 and end plates 14, 16 and out the exit plumbing 54.

During fuel cell operation, the anode hydrogen gas is split into two protons ($H^+$), thus freeing two electrons. The protons migrate across the membrane of the MEA 4, 6 to the cathode side. The oxygen or air introduced at the cathode side flows into the porous electrode. Catalyst particles within the cathode facilitate a reaction between the protons ($H^+$) and oxygen ($O_2$), to form water within the electrode. The gas flow from the porous cathode material must be maintained despite the water generation. Flooding the electrode with water impedes gas flow to the PEM through the MEA 4, 6, decreasing or interrupting reactions occurring at the MEA 4, 6. In an embodiment of the present invention the permanently hydrophilic polymer-coated bipolar separator plate facilitates water transportation away from the cathode.

The bipolar plate is constructed of an electroconductive material having a polymeric surface, such as a polymer/graphite composite made by a bulk molding compound (BMC) process or a metal having a polymeric, conductive coating. For example, United States Patent Application 2005/0001352, Chen-Chi Martin Ma et al. and U.S. Pat. No. 6,248,467, Wilson et al., both of which are incorporated herein by reference, describe composite bipolar plates made from materials containing a vinyl ester resin and conductive powder, e.g., 60-80 wt. % graphite powder. The bipolar plate may include an electrically non-conductive base plate having electrically conductive outer layers in communication with other electrically conductive layers across a fuel cell stack.

The bipolar plate exterior surfaces adjacent on either side to a membrane-electrode-assembly may be molded with gas flow channels, or flow fields, to aid in distributing the reactant gases over the surface of the PEM, or the gas flow fields may be etched or cut into the surfaces after the bipolar plate is molded. When the fuel cell is fully assembled, each exterior surface of the bipolar plate presses against a gas diffusion media (such as 36 or 38 in FIG. 1, which may be, e.g., carbon/graphite paper) that, in turn, press against the MEAs (such as 4 or 6 in FIG. 1, respectively).

In order to achieve stable PEM fuel cell operation over a wide range of loads, it is necessary to properly manage fluid flow, and more particularly liquid flow, of electrochemical reaction products in a fuel cell. For example, water that is produced by the oxidation of hydrogen fuel which occurs during operation of a fuel cell and must be effectively circulated and removed to maintain a stable fuel cell operation. If water is allowed to accumulate in a fuel cell it will flood the fuel cell and interfere with its efficient operation. The present invention provides a hydrophilic coating on the flow field surface to aid in removing water to maintain stable performance of the fuel cell, i.e., the hydrophilic coating allows the fuel cell to operate without flooding by favoring the formation of thin water films that do not significantly impede the reactant gas flows.

Figure 2:
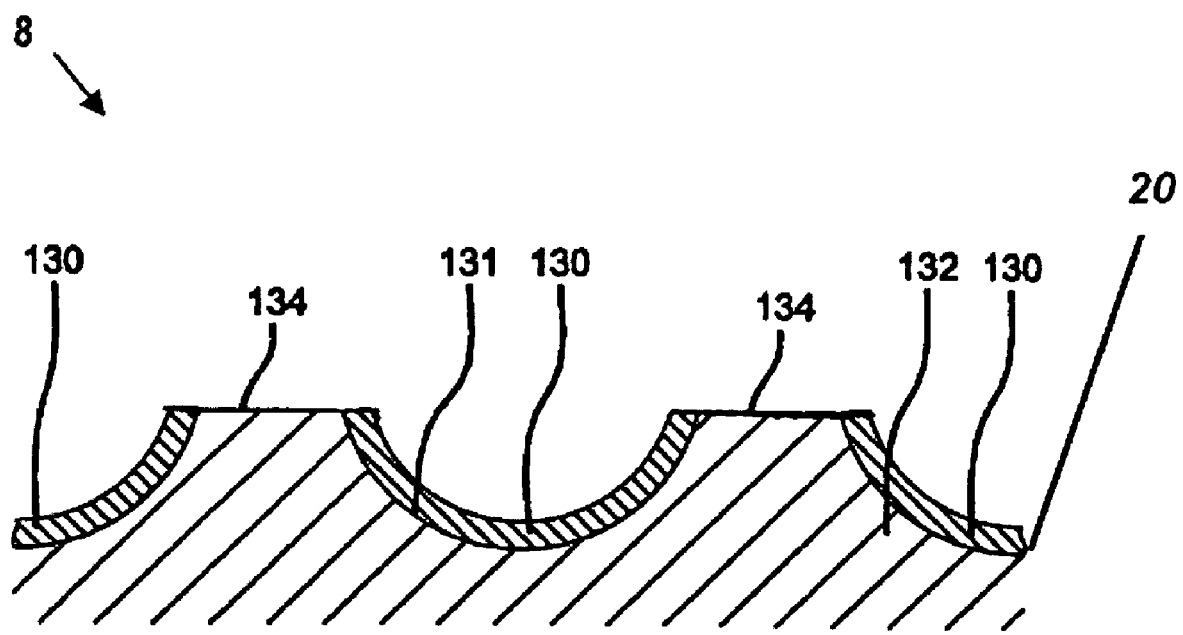
FIG. 2 is a partial, cross sectional view of a magnified portion of the bipolar plate of FIG. 1.

FIG. 2 shows a partial, cross sectional view of a magnified portion of the electrically active side 20 of the bipolar plate 8 of FIG. 1. The semi-circular channel geometry is included here only as an example; in practice, this geometry may be, for example, square, rectangular, triangular, or variations thereof, that can reasonably be attained through available manufacturing processes. Electroconductive material 132 that forms the body of bipolar plate 8 is inscribed with channels 131 and lands 134. Lands 134 press against gas diffusion media 36 in electroconductive connection. Channels 131 are coated with chemically bonded, permanently hydrophilic polymeric coating 130 to facilitate product removal from the cell.

In one embodiment, the permanently hydrophilic polymeric coating is formed by polymerization of an ethylenically unsaturated monomer having a hydrophilic group. Examples of hydrophilic groups include, without limitation, hydroxyl groups, carboxylic acid groups, acid anhydride groups (which hydrolyze to acid groups in the presence of water), sulfonic acid groups, amine groups, amide groups, and other groups having similar polarity. The term "(meth)acrylate" is used herein to refer to and include both the acrylate compound and the methacrylate compound. Examples of ethylenically unsaturated monomers having hydrophilic groups include, without limitation, vinyl esters such as vinyl acetate (which may be hydrolyzed after polymerization to the alcohol group); hydroxyl-functional monomers, including hydroxyalkyl(meth)acrylates such as hydroxyethyl acrylate, hydroxyethyl methacrylate, hydroxypropyl acrylate, hydroxypropyl methacrylate; acid-functional and anhydride-functional monomers such as $\alpha,\beta$-ethylenically unsaturated monocarboxylic acids containing 3 to 5 carbon atoms, $\alpha,\beta$-ethylenically unsaturated dicarboxylic acids containing 4 to 6 carbon atoms and the anhydrides and monoesters of these, such as acrylic acid, $\beta$-carboxyethyl acrylate, methacrylic acid, crotonic acid, maleic acid or maleic anhydride, itaconic acid or itaconic anhydride, and so on and sulfonic acid-functional monomers such as styrene p-sulfonic acid, ethylmethacrylate-2-sulfonic acid and 2-acrylamido-2-methylpropane sulfonic acid; amides such as acrylamide, methacrylamide, and N-alkoxy acrylamides; 2-vinyl pyrrolidone; and combinations of these.

When the coating is applied over a thermoset bipolar plate surface, such as a bipolar plate formed from a thermoset polymer/graphite composite, the coating may be uncrosslinked. When the coating is applied over a thermoplastic bipolar plate, the permanently hydrophilic polymeric coating may be formed by polymerization of an ethylenically unsaturated monomer having a hydrophilic group and a crosslinking monomer having a plurality polymerizable, ethylenically unsaturated groups. Examples of crosslinking monomers having a plurality of ethylenically unsaturated groups include, without limitation, (methacrylate esters of polyols such as alkylene glycol di(meth)acrylates and polyalkylene glycol di(meth)acrylates, such as ethylene glycol di(meth)acrylate, diethylene glycol di(meth)acrylate, triethylene glycol di(meth)acrylate, polyethylene glycol di(meth) acrylate, butylene glycol di(meth)acrylate, 1,6-hexanediol di(meth)acrylate, and neopentyl glycol di(meth)acrylate; trimethylolpropane tri(meth)acrylate, tetramethylolmethane tetra(meth)acrylate, pentaerythritol tetra(meth)acrylate, dipentaerythritol penta(meth)acrylate, dipentaerythritol hexa(meth)acrylate, allyl methacrylate, diallyl phthalate, diallyl terephthalate, divinylbenzene, and combinations of these.

The hydrophilic monomer and crosslinking monomer are selected and apportioned to provide the permanently hydrophilic, polymer coating according to the invention. In certain embodiments, the relative amounts of hydrophilic and crosslinking monomer may be about 0 to about 100 parts by weight hydrophilic monomer to about 0 to 100 parts by weight crosslinking monomer, preferably about 50 to about 99 parts by weight hydrophilic monomer to about 1 to 50 parts by weight crosslinking monomer, and more preferably about 70 to about 95 parts by weight hydrophilic monomer to about 5 to 30 parts by weight crosslinking monomer Small amounts of other monomers may be polymerized along with the hydrophilic and crosslinking monomers, so long as the crosslinked coating is sufficiently hydrophilic to aid in water removal from the cell. Examples of suitable co-monomers include, without limitation, esters $\alpha,\beta$-ethylenically unsaturated monocarboxylic acids containing 3 to 5 carbon atoms such as acrylic, methacrylic, and crotonic acids and diesters of $\alpha,\beta$-ethylenically unsaturated dicarboxylic acids containing 4 to 6 carbon atoms; vinyl esters, vinyl ethers, vinyl ketones, and aromatic or heterocyclic aliphatic vinyl compounds. Representative examples of suitable esters include, without limitation, those esters from reaction with saturated aliphatic alcohols containing up to 20 carbon atoms, such as propyl, isopropyl, n-butyl, isobutyl, tert-butyl, hexyl, 2-ethylhexyl, dodecyl, cyclohexyl, alkyl-substituted cyclohexyl, alkanol-substituted cyclohexyl, such as 2-tert-butyl and 4-tert-butyl cyclohexyl, 4-cyclohexyl-1-butyl, and 3,3,5, 5,-tetramethyl cyclohexyl; isobornyl, lauryl, and stearyl acrylates, methacrylates, and crotonates diesters of unsaturated dicarboxylic acids such as dimethyl, diethyl, and dipropyl malates, maleates, and itaconates, and mixed esters such as methyl, ethyl maleate. Representative examples of co-polymerizable vinyl monomers include, without limitation, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, $\alpha$-methyl styrene, vinyl toluene, and tert-butyl styrene. The co-monomers may be used in any combination.

The monomer mixture is applied to at least a portion of the flow field of an electroconductive plate (bipolar plate or end plate) of the fuel cell. The monomer mixture may be diluted with a solvent. Suitable solvents include, without limitation, esters, alcohols, ketones, and hydrocarbons. Specific examples include, without limitation, ethyl acetate, methyl acetate, butyl acetate, methanol, ethanol isopropanol, butanol, isobutanol, tert-butanol, acetone, methyl ethyl ketone, methyl isopropyl ketone, toluene, and combinations of these. The monomer mixture may be diluted with solvent to an appropriate concentration for a desired application technique and to obtain a desired coating thickness after application and polymerization. The solvent may be evaporated from the coating layer before polymerization by ambient evaporation, with application of convection heat, with infrared heaters, or other such means.

The monomer mixture may be applied in a coating layer on the surface of the plate for example, without limitation, by spin coating, spraying, dipping, brushing. solution casting, or screen printing. The coating reduces liquid accumulation on the region as fluid flows through the flow field, as compared to an uncoated region. The applied monomer mixture is polymerized by using plasma to concurrently chemically bind the coating layer to the plate surface. The plasma is desirably produced either by a radio frequency (rf) field or by microwave energy coupled to the natural resonant frequency of plasma electrons in a static magnetic field. A low-temperature plasma may be obtained by applying a voltage at gas pressures between about 50 mtorr to about 5 torr. The electrodes may be external or internal parallel planar electrodes. The residual gas used in sustaining the plasma may be, for example and without limitation, hydrogen, methane, nitrogen, oxygen, or a noble gas such as helium or argon. The energetic discharge environment is sufficient to decompose gas molecules into electrons, ions, atoms, free radicals, and molecules in ground and excited states. The net effect of interaction induces polymerization of the monomers and chemical bonding to the surface of the plate.

The coating may be applied at any thickness effective to aid in fluid transport in the flow field, but preferably the film is from about 50 to about 500 nm, more preferably from about 100 to about 200 nm. If the coating is applied by a method that results in coating being applied on lands of the flow field, the coating may be thin enough to allow current to flow through it. Alternatively, the monomer mixture that is applied on the lands may be removed, for example with a doctor blade, before polymerization, or the coating may be abraded from the lands after polymerization.

The coated bipolar plate is used in a separator assembly in an electrochemical fuel cell that provides integrated water management. Such water management functions include: moving water away from the wet areas of the cathode side of the fuel cell, where it is generated as a product in the fuel cell electrochemical reaction; moving water away from the wet areas of the anode side of the fuel cell, where it can reside as a result of condensation of water from the reactant gas stream or by transport of product water across the MEA; preventing water build up in any curves or bends in the flow field by reducing fluid accumulation; and more fully enabling the internal transporting of water to any relatively dry areas along the cathode side. The coating reduces liquid accumulation as fluid flows through the flow field, as compared to the degree of liquid accumulation in the flow field if it were uncoated.

EXAMPLE 1

Bipolar Plate with Chemically Bonded, Permanently Hydrophilic Polymer Coating

A mixture of 80 parts by weight poly(ethylene glycol) acrylate and 20 parts by weight poly(ethylene glycol)diacrylate is diluted with 500 parts by weight acetone to form a monomer solution. The monomer solution is applied by spin coating in a coating layer onto the faces of a carbon composite bipolar plate having a flow field formed into each face. The applied solution is allowed to dry in air, then the coating layers are exposed to a microwave plasma (800 Watts, chamber pressure 33 Pa). Argon was passed into the chamber at a flow rate of 299 ml/min for 120 seconds. The coating layer is then fully polymerized and has excellent adhesion to the composite surface. The coated surface has a contact angle of less than 20 degrees for water. The contact angle is not changed by subjecting the coating to dry, heated air (90° C.) or boiling water.

EXAMPLE 2

Bipolar Plate with Chemically Bonded, Permanently Hydrophilic Polymer Coating

Example 1 is repeated, except that the coating layers are now exposed to a radio frequency (rf) plasma (operated at 13.56 MHz) for 120 seconds at nitrogen flow rate of 30 ml/min, with a forward power of 100 Watts and a reflective power of 5 Watts. Again, the coating layer is then fully polymerized and has excellent adhesion to the composite surface. The coated surface has a contact angle of less than 20 degrees for water.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell electrically conductive element, comprising a thermoplastic polymeric surface comprising a flow field, at least a part of the flow field having a permanently hydrophilic, crosslinked polymer coating that is formed from a mixture of a first ethylenically-unsaturated monomer having a hydrophilic group and a second distinct crosslinking monomer having at least one ethylenically unsaturated group for crosslinking, wherein said mixture comprises about 50 to about 99 parts by weight of said first hydrophilic monomer and about 1 to about 50 parts by weight of said second crosslinking monomer, and said mixture forms said polymer coating grafted to the polymeric surface after cross-linking.

2. A fuel cell electrically conductive element according to claim 1, wherein the element is a bipolar plate comprising two surfaces, each comprising a flow field.

3. A fuel cell electrically conductive element according to claim 2, wherein the coating is grafted to the surface during plasma polymerization of the coating.

4. A fuel cell electrically conductive element according to claim 2, wherein the bipolar plate comprises a polymer/graphite composite.

5. A fuel cell element according to claim 1, wherein said first hydrophilic monomer of the polymer coating comprises at least one hydrophilic group selected from hydroxyl groups, acid groups, and amine groups.

6. A fuel cell element according to claim 1, wherein flow field has lands and channels, and further wherein the lands are free of the coating.

7. A fuel cell element according to claim 1, wherein flow field has lands and channels, and further wherein electric current flows through coating on the lands.

8. A fuel cell element according to claim 1, wherein the permanently hydrophilic polymer coating has a dynamic contact angle for water of 30° or less for both advancing and receding contact angles.

9. A fuel cell electrically conductive element according to claim 1, wherein said first ethylenically-unsaturated monomer comprising said hydrophilic group comprises at least one monomer selected from the group consisting of: hydroxy-functional monomers, acid-functional monomers, amine-functional monomers, and combinations thereof.

10. A fuel cell electrically conductive element according to claim 1, wherein said first ethylenically-unsaturated monomer having said hydrophilic group is selected from the group consisting of: vinyl esters, vinyl acetate; hydroxyalkyl (meth) acrylates, hydroxyethyl acrylate, hydroxyethyl methacrylate, hydroxypropyl acrylate, hydroxypropyl methacrylate; α,β-ethylenically unsaturated monocarboxylic acids containing 3 to 5 carbon atoms, α,β-ethylenically unsaturated dicarboxylic acids containing 4 to 6 carbon atoms, anhydrides and monoesters of α,β-ethylenically unsaturated monocarboxylic and dicarboxylic acids, acrylic acid, β-carboxyethyl acrylate, methacrylic acid, crotonic acid, maleic acid, maleic anhydride, itaconic acid, itaconic anhydride; sulfonic acid-functional monomers, styrene p-sulfonic acid, ethylmethacrylate-2-sulfonic acid, 2-acrylamido-2-methylpropane sulfonic acid; acrylamide, methacrylamide, and N-alkoxy acrylamides; 2-vinyl pyrrolidone; and combinations thereof.

11. A fuel cell electrically conductive element according to claim 1, wherein said second crosslinking monomer comprises at least one of alkylene glycol di(meth)acrylates and polyalkylene glycol di(meth)acrylates.

12. A fuel cell electrically conductive element according to claim 1, wherein said second crosslinking monomer having at least one ethylenically unsaturated group for crosslinking is selected from the group consisting of: (meth)acrylate esters of polyols, alkylene glycol di(meth)acrylates, polyalkylene glycol di(meth)acrylates, ethylene glycol di(meth)acrylate, diethylene glycol di(meth)acrylate, triethylene glycol di(meth)acrylate, polyethylene glycol di(meth)acrylate, butylene glycol di(meth)acrylate, 1,6-hexanediol di(meth) acrylate, neopentyl glycol di(meth)acrylate; trimethylolpropane tri(meth)acrylate, tetramethylolmethane tetra(meth) acrylate, pentaerythritol tetra(meth)acrylate, dipentaerythritol penta(meth)acrylate, dipentaerythritol hexa (meth)acrylate, allyl methacrylate, diallyl phthalate, diallyl terephthalate, divinylbenzene, and combinations thereof.

13. A fuel cell electrically conductive element according to claim 1, wherein said mixture forming said permanently hydrophilic, crosslinked polymer coating comprises about 70 to about 95 parts by weight of said first hydrophilic monomer and about 5 to about 30 parts by weight of said second crosslinking monomer.

14. A fuel cell electrically conductive element according to claim 1, wherein said first ethylenically-unsaturated monomer having said hydrophilic group comprises polyethylene glycol (meth)acrylate and said second crosslinking monomer having at least one ethylenically unsaturated group for crosslinking comprises polyalkylene glycol di(meth)acrylates.

* * * * *